US008648705B2

(12) United States Patent
Gross et al.

(10) Patent No.: US 8,648,705 B2
(45) Date of Patent: Feb. 11, 2014

(54) METHODS AND SYSTEMS FOR AUTOMATED EMERGENCY LIGHTING

(75) Inventors: William Henry Gross, Erie, PA (US); Ronald David Bauerle, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/470,735

(22) Filed: May 14, 2012

(65) Prior Publication Data

US 2012/0223831 A1 Sep. 6, 2012

Related U.S. Application Data

(63) Continuation of application No. 12/464,592, filed on May 12, 2009, now Pat. No. 8,198,995.

(60) Provisional application No. 61/052,302, filed on May 12, 2008.

(51) Int. Cl.
*B60Q 1/50* (2006.01)

(52) U.S. Cl.
USPC ............................ 340/467; 340/453; 340/438

(58) Field of Classification Search
USPC ......... 340/438, 452, 453, 458, 463, 464, 467, 340/468, 471, 479; 307/10.1, 10.8
See application file for complete search history.

(56) References Cited

U.S. PATENT DOCUMENTS

| 4,806,782 | A | * | 2/1989 | Bernal | 307/10.1 |
| 4,918,424 | A | * | 4/1990 | Sykora | 340/464 |
| 5,207,770 | A | * | 5/1993 | Fecher | 91/369.4 |
| 5,770,999 | A | * | 6/1998 | Rhodes | 340/468 |
| 5,801,624 | A | * | 9/1998 | Tilly et al. | 340/479 |

\* cited by examiner

*Primary Examiner* — Van T. Trieu

(74) *Attorney, Agent, or Firm* — GE Global Patent Operation; John A. Kramer

(57) ABSTRACT

A control circuit for activating at least one emergency light when a vehicle's brakes are applied is described. The control circuit includes a pressure switch configured to selectively couple a power source and an electrically-operated actuator to facilitate selectively energizing the electrically-operated actuator. The electrically-operated actuator includes at least one contact set configured to couple the power source to the at least one emergency light when the electrically-operated actuator is not energized. The control circuit also includes a manual reset circuit coupled to the pressure switch and to the electrically-operated actuator. The manual reset circuit configured to facilitate energizing the electrically-operated actuator upon receipt of an operator input.

30 Claims, 6 Drawing Sheets

METHODS AND SYSTEMS FOR AUTOMATED EMERGENCY LIGHTING

CROSS-REFERENCE TO RELATED APPLICATIONS

This application is a continuation of U.S. patent application Ser. No. 12/464,592, filed 12 May 2009 (the "'592 application") (and issued as U.S. Pat. No. 8,198,995), which claims the benefit of U.S. Provisional Application No. 61/052,302, filed May 12, 2008 (the "'302 application"). The entire disclosures of the '592 application and the '302 application are incorporated by reference.

BACKGROUND

Certain embodiments of the presently described inventive subject matter generally relate to automated railroad operation or other vehicle operation. Certain embodiments relate to methods and systems for automatically activating emergency lights during operation of a vehicle.

At least some known locomotives include an emergency lighting system that provides egress lighting to locomotive passengers and/or emergency workers upon application of the emergency brakes. To activate such emergency lighting systems, at least some known locomotives include a brake master controller and/or a locomotive computer (CMU) that communicates a signal to the lighting system. When the brake master controller and/or the CMU are not functional, such as when the locomotive is not providing power, however, the emergency lighting system may not be able to receive the signal to activate the emergency lights.

Further, in at least some known instances, power to the emergency lighting system may be provided by a back-up power source or a locomotive battery. As such, in at least some instances, it may be desired that the emergency lighting system be deactivated in order to conserve energy from the back-up power source or locomotive battery when additional lighting is not necessary.

BRIEF DESCRIPTION

In one aspect, an emergency lighting control circuit for a vehicle is provided. The control circuit includes a pressure switch configured to selectively couple a power source and an electrically-operated actuator to facilitate selectively energizing the electrically-operated actuator. The electrically-operated actuator includes at least one contact set configured to couple the power source to at least one emergency light when the electrically-operated actuator is not energized. The control circuit also includes a manual reset circuit coupled to the pressure switch and to the electrically-operated actuator. The manual reset circuit is configured to facilitate energizing the electrically-operated actuator upon receipt of an operator input.

In another aspect, an emergency lighting system for a vehicle is provided. The emergency lighting system includes a power source, an electrically-operated actuator, and one or more emergency lights. The emergency lighting system also includes a pressure switch configured to selectively couple the power source and the electrically-operated actuator based on a brake pressure level (e.g., the pressure level in a brake pipe) to facilitate selectively energizing the electrically-operated actuator. The electrically-operated actuator is configured to couple the power source and the one or more emergency lights when the electrically-operated actuator is not energized. The emergency lighting system also includes a manual reset circuit configured to selectively couple the pressure switch and the electrically-operated actuator. The manual reset circuit is configured to facilitate energizing the electrically-operated actuator upon receipt of an operator input.

In yet another aspect, a method for controlling emergency lighting in a vehicle is provided. The method includes sensing application of an emergency brake of the vehicle by measuring a pressure associated with the emergency brake and automatically energizing at least one emergency light upon sensing application of the emergency brake of the vehicle. The method also includes discontinuing a supply of power provided to the at least one emergency light upon at least one of release of the emergency brake of the vehicle and receipt of a manual reset input.

DETAILED DESCRIPTION

Many specific details of certain embodiments of the inventive subject matter are set forth in the following description in order to provide a thorough understanding of such embodiments. One of ordinary skill in the art, however, will understand that the presently described inventive subject matter may have additional embodiments, or that the presently described inventive subject matter may be practiced without several of the details described in the following description.

Moreover, as used herein, the term "locomotive" may include any car and/or engine configured for use on a railroad, and may also be called a "railcar," an "engine," or a "freight car." A locomotive as described herein is intended as an example only, and is thus not intended to limit in any way the definition and/or meaning of the term "locomotive." Furthermore, although the inventive subject matter is described in association with a railroad and locomotives, it should be understood that the presently described inventive subject matter is applicable to other modes of transportation and, in fact, is applicable to any device and/or apparatus (e.g., vehicles other than locomotives) for which an emergency lighting system may be used.

Figure 1:
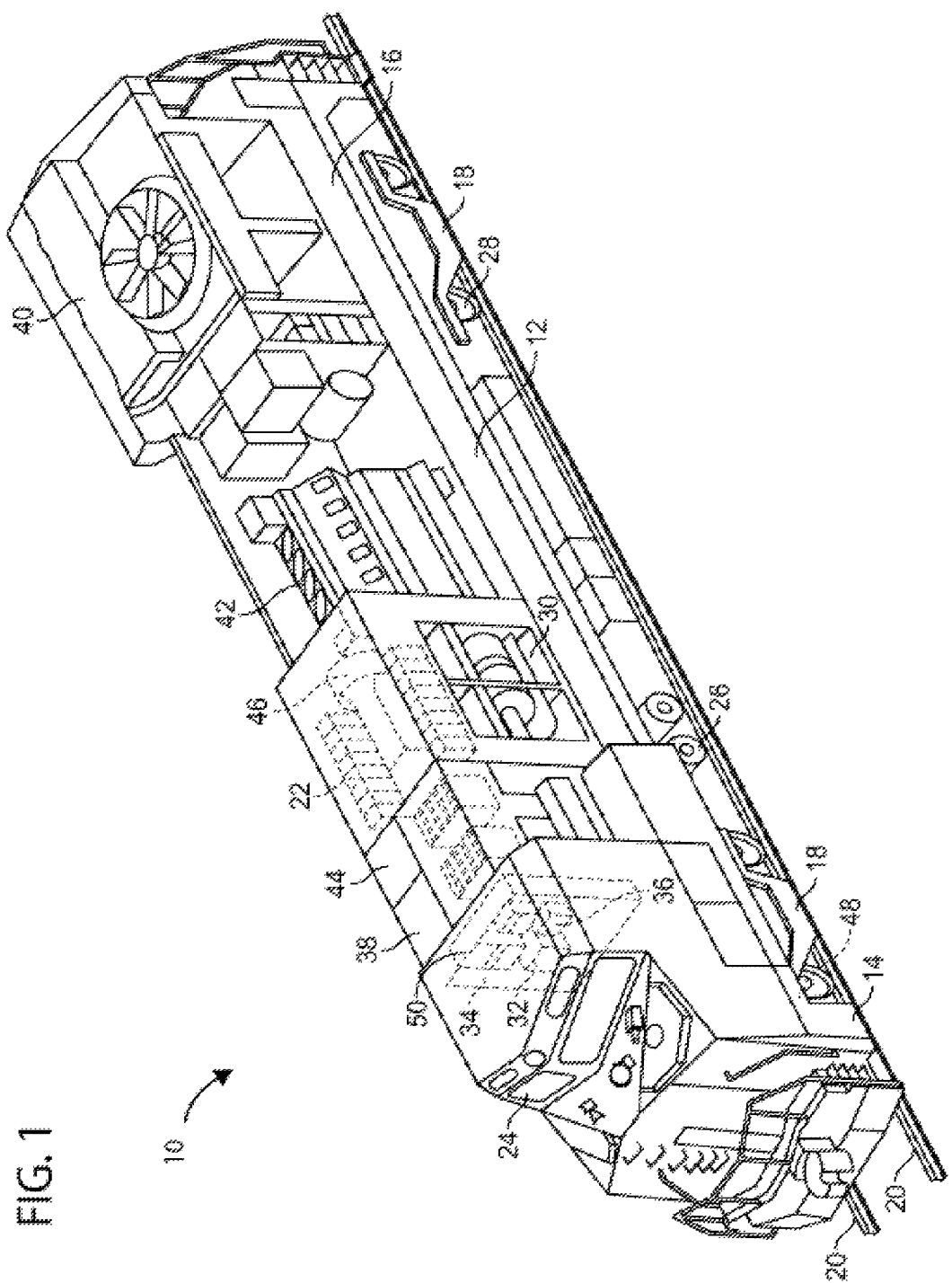
FIG. 1 is a partial cut away view of an example locomotive.

FIG. 1 is a partial cut away view of an example vehicle 10, such as a locomotive. In the example embodiment, the vehicle 10 includes a platform 12 having a first end 14 and an opposite second end 16. Moreover, in the example embodiment, a propulsion system 18, or truck, is coupled to platform 12 for supporting, and propelling platform 12 on a pair of rails 20. An equipment compartment 22 and an operator cab 24 extend from platform 12. An air brake system 26 provides compressed air to the vehicle 10 for use in actuating a plurality of air brakes 28 on the vehicle 10 and railcars (not shown) behind it. An auxiliary alternator system 30 supplies power to auxiliary equipment, and an intra-consist communications system 32 collects, distributes, and displays consist data across all vehicles 10 included in a consist.

A cab signal system 34 couples a wayside unit (not shown) to a control system 36. In particular, in the example embodiment, system 34 receives coded signals from a pair of rails 20 through track receivers (not shown) located on the front and rear of the vehicle 10. Information received conveys the speed limit and operating mode to the operator of the vehicle 10. A distributed power control system 38 enables remote control operation of multiple vehicles 10 coupled in the consist. System 38 also provides for control of tractive power in motoring and braking, as well as control of air brakes 28.

An engine cooling system 40 facilitates maintaining an operating temperature of engine 42 and other components below a pre-determined temperature. In addition, cooling system 40 also facilitates minimizing engine thermal cycling by maintaining an optimal engine temperature throughout the operating load range, and thus reducing overheating in tunnels. An equipment ventilation system 44 provides additional cooling to equipment within the vehicle 10.

A traction alternator system 46 converts mechanical power to electrical power that is then supplied to propulsion system 18. Propulsion system 18 enables the vehicle 10 to move, and in the example embodiment includes at least one traction motor 48 and dynamic braking capability. In particular, the propulsion system 18 receives power from traction alternator 46, and through traction motors 48 moves the vehicle 10. Further, in the example embodiment, the vehicle 10 includes an emergency lighting system 50 that is configured to activate at least one emergency light 51 when brakes 28 are activated in an emergency situation. In an example embodiment, the at least one emergency light 51 includes an emergency brake light positioned within operator cab 24 to illuminate an exit door and/or a path to the exit door. In some embodiments, emergency brake lights 51 are provided that illuminate an exit path from each passenger seat to each exit door, and may also be provided outside of the vehicle 10 to, for example, illuminate exit steps.

The vehicle 10 also includes a signaling system that includes a horn 52 and a bell 54 for signaling to persons outside of operator cab 24. Horn 52 and bell 54 are used at specific times during transit operations, such as approaching grades or crossings to warn of the approach of the vehicle 10. A wireless data preservation programming and management system is carried on-board the vehicle 10. Data preservation programming and management system includes an antenna configured to transmit and receive signals between the vehicle 10 and off-board communications devices through, for example, but not limited to, an 802.11g link, a satellite link, a UHF link, and/or a VHF link. Data preservation programming and management system also may include a video camera configured to acquire video and/or audio data from an external environment of the vehicle 10.

Figure 2:
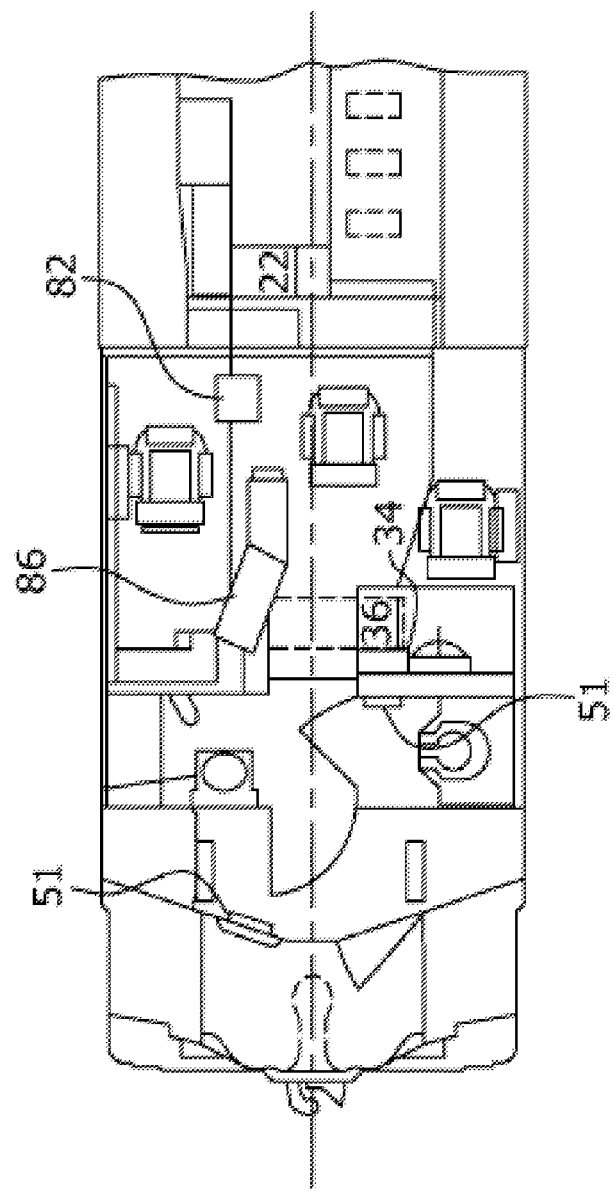
FIG. 2 is a top view of the locomotive shown in FIG. 1.
Figure 3:
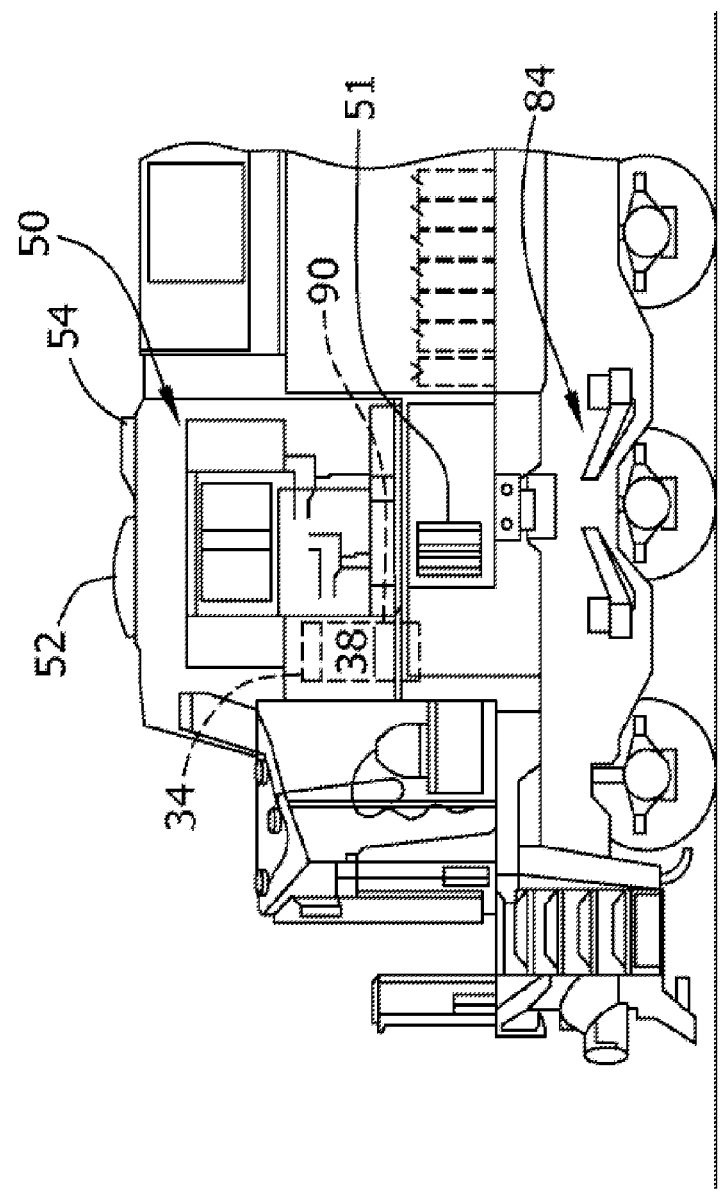
FIG. 3 is a side view of the locomotive shown in FIG. 1.

FIG. 2 is a top view of the vehicle 10 (shown in FIG. 1). FIG. 3 is a side view of the vehicle 10 (shown in FIG. 1). In the example embodiment, emergency lighting system 50 (shown in FIG. 1) includes a circuit breaker 82, a brake pressure switch 84, at least one emergency light 51 (also shown in FIG. 1), and a manual reset device 86 (e.g., a manual reset circuit) that includes a manual reset switch 88 and an electrically-operated actuator 90 (e.g., a relay and/or a solenoid switch).

Figure 4:
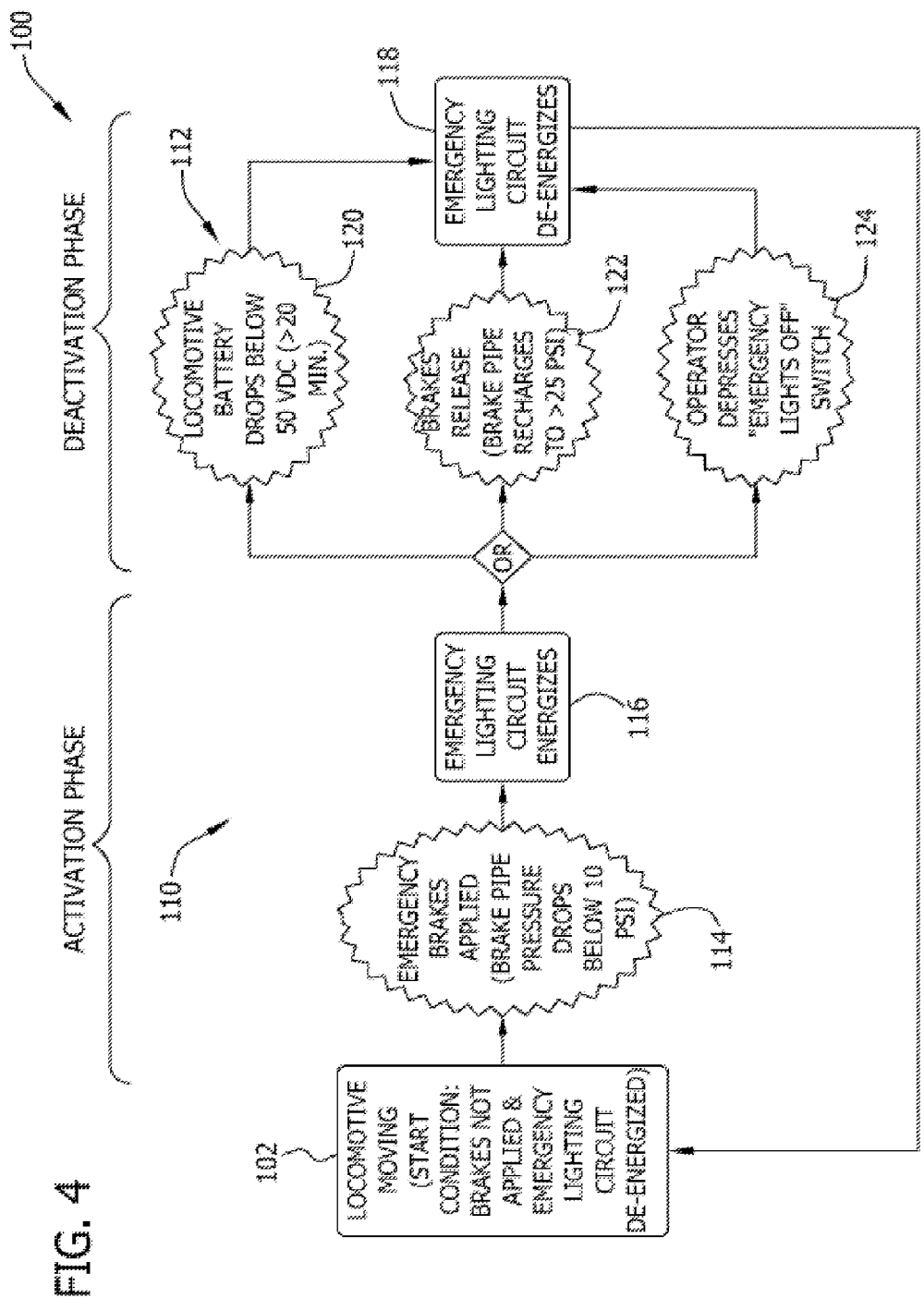
FIG. 4 is a flow chart of an example method for controlling an emergency lighting system.

FIG. 4 is a flow chart of an example method 100 for controlling an emergency lighting system, for example, emergency lighting system 50 (shown in FIG. 1). In an example embodiment, emergency lighting system 50 includes at least one emergency light, for example, emergency lights 51 (shown in FIG. 1). Method 100 includes a start condition 102 wherein emergency lights 51 are not activated (i.e., emergency lights are not lit). Typically, in start condition 102, a vehicle, for example, the vehicle 10 (shown in FIG. 1) is in motion and air brakes 28 (shown in FIG. 1) are not applied. In the example embodiment, method 100 includes an activating phase 110 and a deactivating phase 112. Activating phase 110 includes sensing 114 an emergency application of brakes 28 and energizing 116 emergency lights 51. For example, activating phase 110 may include sensing 114 that brakes 28 (shown in FIG. 1) are applied and energizing 116 emergency lights 51 to illuminate exit paths when emergency brakes 28 are applied, as described above. In an example embodiment, emergency application of brakes 28 is sensed 114 by measuring a brake pipe pressure. For example, emergency application of brakes 28 may be sensed 114 when the brake pipe pressure drops below a predetermined pressure level. In one specific embodiment, application of brakes 28 is sensed 114 when the brake pipe pressure drops below ten pounds per square inch (10 psi).

In other words, to increase visibility in an emergency situation, emergency lights 51 are energized 116, illuminating emergency lights 51. In an example embodiment, deactivating phase 112 facilitates resetting emergency lighting system 50, and therefore, discontinuing 118 a supply of power provided to emergency lights 51 (i.e., turning-off the emergency lights). In an example embodiment, deactivating phase 112 includes monitoring 120 a battery power level, sensing 122 that brakes 28 have been released, and receiving 124 a manual reset input. In the example embodiment, discontinuing 118 is performed upon the occurrence of at least one of three events. For example, the three events may include a reduction in a battery power level (e.g., the power level of the battery dropping below a power level sufficient for operation of emergency lights 51), release of brakes 28, and a manual reset of emergency lighting system 50 by the operator of the vehicle 10.

In an example embodiment, illumination provided by emergency lights 51 is discontinued 118 when the battery power level drops below a voltage threshold required for emergency lights 51 to function. In an alternative embodiment, power provided to emergency lights 51 is discontinued 118 when the monitored battery power level is below a predetermined level for a predetermined length of time. For example, power may be discontinued 118 when the monitored 120 battery power level is below 60% of a rated battery maximum power level for at least twenty minutes. More specifically, power to emergency lights 51 may be discontinued 118 when the monitored 120 battery power level is below fifty volts direct current (50 VDC) for at least twenty minutes. Deactivating 112 emergency lights 51 when a battery power level is reduced a predetermined amount facilitates preventing emergency lights 51 from removing all of the stored energy from the battery.

In an example embodiment, power provided to emergency lights 51 is discontinued 118 when brakes 28 are no longer applied. In some embodiments, emergency lighting system 50 senses 122 that emergency brakes 28 have been released when a measured brake pipe pressure increases to a predetermined pressure level. For example, emergency lighting system 50 senses 122 that brakes 28 have been released when the measured brake pipe pressure increases to twenty-five pounds per square inch (25 psi) or above.

In an example embodiment, power provided to emergency lights 51 is discontinued 118 upon receipt 124 of a manual reset input. For example, manual reset switch 84 (shown in FIG. 2) may be provided to an operator of the vehicle 10. The emergency lighting system 50 receives 124 a manual reset input from manual reset switch 84 when the operator chooses to manually discontinue 118 providing power to emergency lights 51. The operator may decide to deactivate emergency lights 51 when emergency lighting is not necessary, for example, if emergency brakes 28 are applied and it is daytime. If it is bright outside, emergency lights 51 may not increase visibility of exit paths and/or exits compared to the illumination provided by sunshine. Furthermore, the operator may decide to deactivate emergency lights 51 if emergency lighting system 50 activates emergency lights 51 during a non-emergency. Upon detection of at least one of the deactivating 112 events, emergency lighting system 50 returns to start condition 102.

Figure 5:
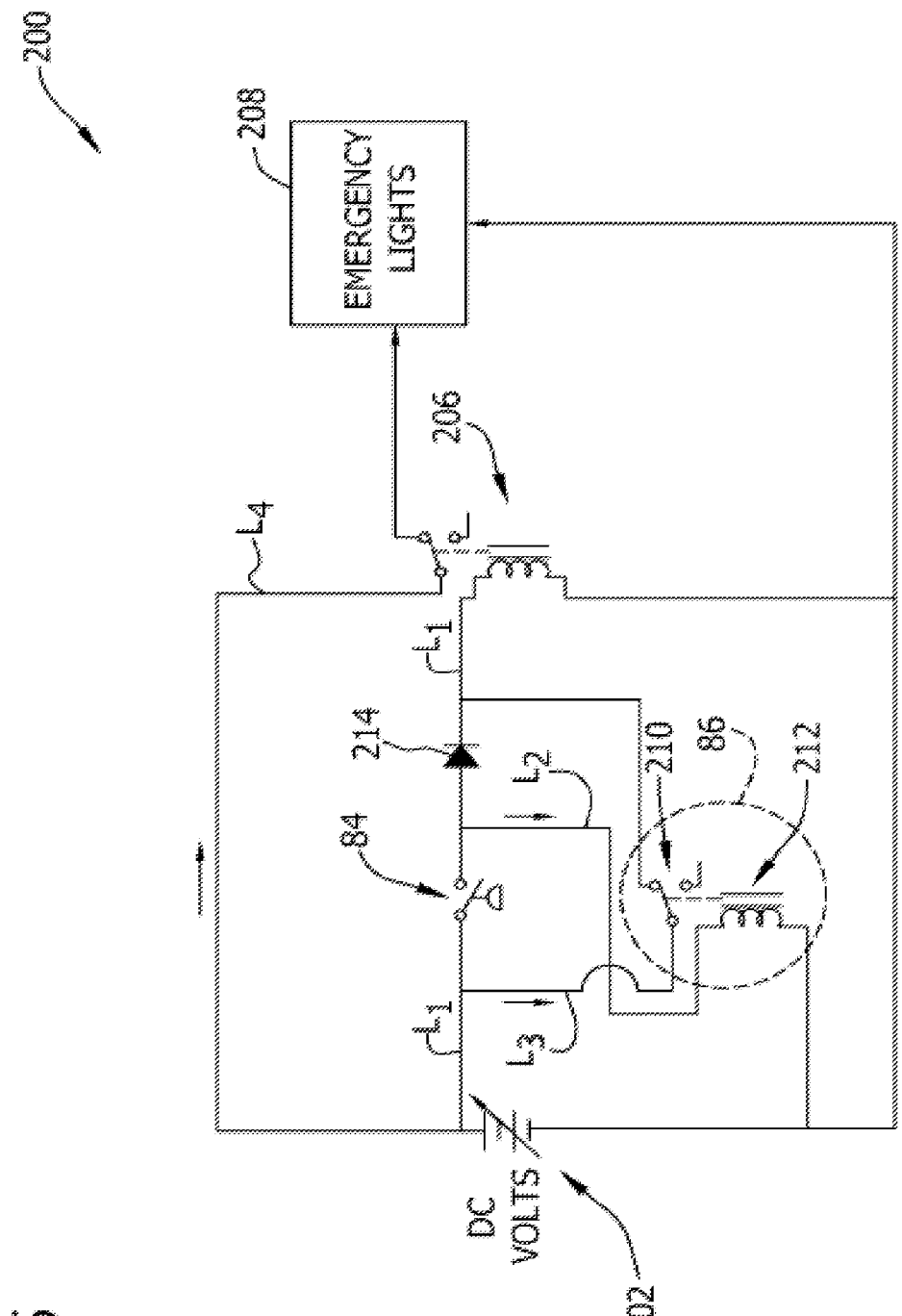
FIG. 5 is a schematic view of an example circuit for an emergency lighting system, for example, the emergency lighting system shown in FIG. 1.

FIG. 5 is a schematic view of an example circuit 200 of an emergency lighting system, for example, emergency lighting system 50 (shown in FIG. 1), for use within a vehicle, such as the vehicle 10 (shown in FIG. 1). Although, circuit 200 is described with respect to a locomotive, as will be appreciated by one of ordinary skill in the art, circuit 200 may be used with any vehicle that is required to activate an emergency lighting system upon activation of a brake system.

In an example embodiment, circuit 200 includes a battery 202 that provides current via a line $L_1$ to a pressure switch, for example, brake pipe pressure switch 84 (also shown in FIG. 3). Brake pipe pressure switch 84 is coupled to and communicates with a brake pipe (not shown) of air brake 28 (shown in FIG. 1). In the example embodiment, switch 84 is a pressure switch that opens or closes based on pressure changes in air brake 28. In an alternative embodiment, switch 84 may be any switch that opens and closes based on a measured property of air brake 28. As used herein, unless otherwise specified, a "pressure switch" is any switch that opens and closes based on a measured property of brake 28. For example, as described above, a measured property of an air brake may be an air pressure level and/or a hydraulic fluid pressure level. In another example, a measured property of an electronic brake may be a current level, wherein a current level above, or absence of a current, may indicate an application of an emergency brake. Further, in an alternative embodiment, battery 202 may be any suitable source of power.

In the example embodiment, circuit 200 includes an electrically-operated actuator, for example, a solenoid switch 206. In the example embodiment, solenoid switch 206 is electrically coupled to pressure switch 84 via line $L_1$. Although described herein as a solenoid switch, an electrically-operated actuator may be a solenoid switch, a relay, or any suitable switch that enables circuit 200 to operate as described in more detail below. Solenoid switch 206, in the example embodiment, is electrically coupled to emergency lights 208 such that the closing/de-energizing or opening/energizing of solenoid switch 206 activates or deactivates emergency lights 208.

In the example embodiment, circuit 200 also includes a line $L_2$ that is electrically coupled between pressure switch 84 and a manual reset circuit, for example, manual reset device 86 (also shown in FIG. 2). Manual reset device 86 includes a manual reset switch 210 and a solenoid 212. Solenoid 212 is electrically coupled to pressure switch 84, such that solenoid 212 receives a current through pressure switch 84 when pressure switch 84 is in a closed position. Further, in the example embodiment, circuit 200 includes a line $L_3$, also called a bypass line, that is electrically coupled between battery 202 and solenoid switch 206 such that a current may flow from battery 202 to solenoid switch 206 when manual reset switch 210 is engaged by an operator. In the example embodiment, manual reset switch 210 is a momentary switch, for example, a push-button momentary switch or a toggle-type momentary switch. In an alternative embodiment, however, manual reset switch 210 may be any switch that enables circuit 200 to operate as described in more detail below. In addition, in the example embodiment, circuit 200 includes a line $L_4$ that is electrically coupled between battery 202 and emergency lights 208. In the example embodiment, a diode 214 is positioned within $L_1$. Diode 214 facilitates preventing current flowing through $L_3$ from being applied to solenoid switch 212 via $L_2$. Such current may interfere with the activation of manual reset device 86.

During operation, in the example embodiment, battery 202 provides a current to pressure switch 84 that is coupled to and communicates with the brake pipe (not shown) of air brake 28. When the pressure in the brake pipe is at or above a predetermined level, thus indicating that the emergency brake system has not been activated, pressure switch 84 is in a closed position. Accordingly, a portion of the current that is provided by battery 202 is transferred through the closed circuit along line $L_1$ and to solenoid switch 206. Solenoid switch 206 maintains an open circuit position when receiving current from battery 202 such that emergency lights 208 are not activated. Further, when pressure switch 84 is in a closed position, a portion of the current that is provided by battery 202 is transferred through line $L_2$ to solenoid 212 such that solenoid 212 maintains an open circuit position. More specifically, providing a current to solenoid 212 creates an open circuit along line $L_3$.

When brake 28 is activated in an emergency situation, the pressure in the brake pipe drops below a predetermined level and pressure switch 84 moves from a closed circuit position to an open circuit position. Accordingly, an open circuit along line $L_1$ is created between battery 202 and solenoid switch 206. The lack of current provided to solenoid switch 206 causes solenoid switch 206 to move from an open position to a closed position, thus closing the circuit along line $L_4$ and activating emergency lights 208. When the pressure in the brake pipe increases above a predetermined level, indicating a recovery of the brake system, pressure switch 84 moves from an open circuit position to a closed circuit position, current flows through line $L_1$ to solenoid switch 206, and emergency lights 208 are deactivated.

In at least some instances, however, it may be desired to deactivate emergency lights 208 prior to the recovery of the brake system. Accordingly, manual reset device 86, as described above, provides a means to deactivate emergency lights 208 manually. Upon manually closing reset switch 210, solenoid 212 moves from an open circuit position to a closed circuit position and creates a closed circuit along line $L_3$. Accordingly, current supplied from battery 202 is provided to solenoid switch 206. Solenoid switch 206 moves from a closed position to an open position, creates an open circuit along line $L_4$, and deactivates emergency lights 208.

Further, as described above, when the pressure in the brake pipe rises above a predetermined level, pressure switch 84 moves from the open circuit position back to the closed circuit position, thus closing the circuit along line $L_1$ between battery 202 and solenoid switch 206. Current is again supplied through line $L_1$ to solenoid switch 206 and through line $L_2$ to solenoid 212. Accordingly, solenoid 212 is held in an open circuit position, an open circuit is created along line $L_3$, and thus, manual reset device 86 is ready for a subsequent use.

Figure 6:
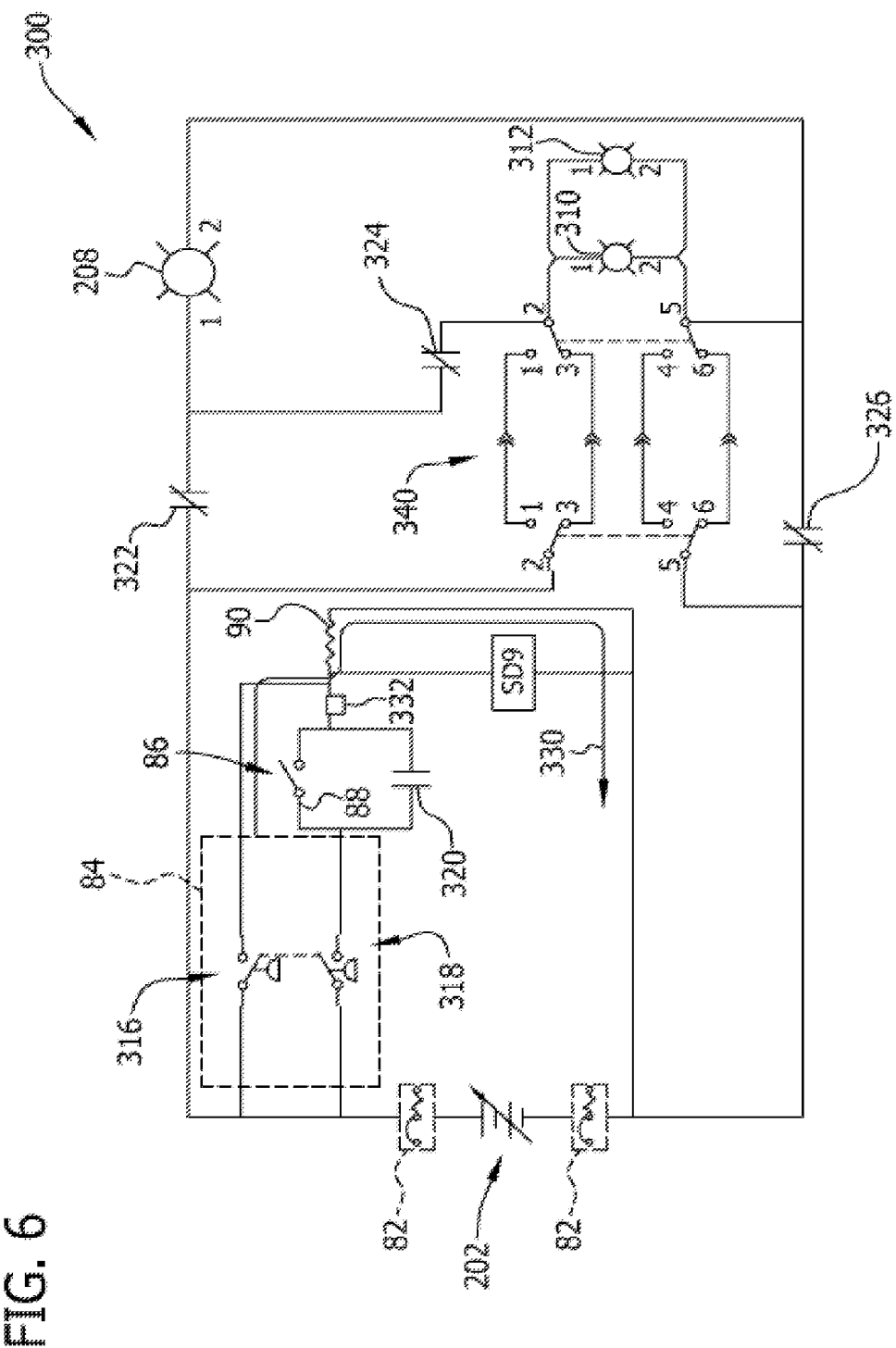
FIG. 6 is a schematic view of an alternative circuit for an emergency lighting system, for example, the emergency lighting system shown in FIG. 1.

FIG. 6 is a schematic view of an alternative embodiment of a control circuit 300. Control circuit 300 may be included within an emergency lighting system, for example, emergency lighting system 50 (shown in FIG. 1) for use within a vehicle, such as locomotive 10 (shown in FIG. 1). Circuit 300 facilitates controlling other locomotive lights, for example, auxiliary lights such as alcove and/or vestibule dome lights 310 and 312 in addition to emergency lights 208. Alcove and/or vestibule dome lights 310 and 312 may be used for normal (e.g., non-emergency) illumination in addition to emergency lighting. For example, alcove and/or vestibule dome lights 310 and 312 and emergency lights 208 may be positioned within operator cab 24 or on locomotive 10 as emergency lights 51 are shown in FIG. 1. As described above, emergency lighting system 50 includes circuit breaker 82, manual reset device 86, brake pressure switch 84, and electrically-operated actuator 90 (also shown in FIG. 3). Electrically-operated actuator 90 may be a solenoid switch, a relay, or any suitable switch that enables circuit 300 to operate as described herein. Brake pressure switch 84 includes a first electrical connection 316 and a second electrical connection 318. For example, brake pressure switch 84 may be configured such that first electrical connection 316 closes when the brake pressure is greater than twenty-five pounds per square inch (25 psi) and opens when the brake pressure is less than ten pounds per square inch (10 psi). Brake pressure switch 84 may also be configured such that second electrical connection 318 closes when the brake pressure is less than 10 psi and opens when the brake pressure is greater than 25 psi. Pressure switch 84 may include multiple independent pressure switches, or alternatively, may include a single pressure switch containing multiple sets of electrical contacts.

In some embodiments, relay 90 includes multiple contact sets, for example, a first relay contact set 320, a second relay contact set 322, a third relay contact set 324, and a fourth relay contact set 326. Each relay contact set 320, 322, 324, and 326 is coupled within circuit 300 in either a normally open (NO) position or a normally closed (NC) position. When relay 90 is not energized, first relay contact set 320 is open and second, third, and fourth contact sets 322, 324, and 326 are closed. Coupling contact sets 320, 322, 324, and 326 in this manner facilitates lighting of emergency lights 208 when relay 90 is not energized, which provides a level of fault tolerance with respect to operation of circuit 300.

In operation, brake pipe pressure switch 84 determines when emergency braking is applied. For example, when brake pipe pressure switch 84 determines that a brake pipe pressure is less than 10 psi, first electrical connection 316 opens, relay 90 is not energized, and therefore, relay contact sets 320, 322, 324, and 326 are in non-energized states (e.g., contact set 320 is open and contact sets 322, 324, and 326 are closed). Electricity flows from battery 202, through second relay contact set 322, energizes emergency lights 208, and through fourth contact set 326 to complete a circuit. Third contact set 324 is closed, which allows electricity to flow through third contact set 324 to auxiliary lights 310 and 312.

When brake pipe pressure switch 84 determines that the brake pipe pressure level has increased, for example, from below 10 psi to above 25 psi, first brake pipe electrical connection 316 closes and second brake pipe electrical connection 318 opens. In some embodiments, relay 90 is energized, closing first contact set 320 and opening second, third, and fourth contact sets 322, 324, and 326. Electricity flows through first brake pipe electrical connection 316 to relay 86 and an emergency light bypass circuit 330 is completed. Open second contact set 322 prevents electricity from reaching emergency lights 208, and therefore, emergency lights 208 are not lit.

As described above, when brake pipe pressure switch 84 determines that the brake pipe pressure level is below, for example, 10 psi, first electrical connection 316 opens and second electrical connection 318 closes. In an example embodiment, manual reset switch 88 is included within manual reset device 86. In an example embodiment, reset device 86 includes reset switch 88 and first relay contact set 320. Reset device 86 allows an operator of the vehicle 10 to turn off emergency lights 208 even though pressure switch 84 indicates that brakes 28 are being applied. For example, reset switch 88 may activate a latch circuit to bypass first electrical connection 316 and energize relay 90. In other words, second electrical connection 318 is closed when the brake pipe pressure level is below 10 psi. Closing reset switch 88 enables electricity to flow through second electrical connection 318 from battery 202 and to energize relay 90. Energizing relay 90 opens second, third, and fourth contact sets 322, 324, and 326, which turns off emergency lights 208. Energizing relay 90 also closes first contact set 320, which couples second electrical connection 318 to relay 90 to maintain current flow to relay 90 when reset switch 88 is released (e.g., opened). Furthermore, circuit 300 may include a delay device 332 to enable circuit 300 to function as described herein. For example, when relay 90 de-energizes due to pressure switch 84 changing state, second electrical connection 318 may close before relay 90 de-energizes and opens first contact set 320. This may allow relay 90 to re-energize and not light emergency lights 208. Delay device 332 delays significant current flow through relay 90 for a predetermined time period sufficient to allow relay 90 to de-energize. If the operator subsequently wants to override the illumination of emergency lights 208, the operator presses reset switch 88 for a time period greater than the predetermined delay, which allows first contact set 320 to latch itself on.

Control circuit 300 may also include a three-way switch 340. In some embodiments, three-way switch 340 is positioned within operator cab 24. Three-way switch 340 enables operator control of auxiliary lights 310 and 312. Control circuit 300 facilitates independently controlling alcove and/or vestibule dome lights 310 and 312 when there is no detected emergency, and overriding the independent control during an emergency to activate lights 310 and 312 regardless of the position of three-way switch 340. As described above, upon a determination that brakes 28 have been applied, relay 90 is de-energized, and contact sets 322, 324, and 326 move to a closed position, which allows current to flow from battery 202 to emergency lights 208 and auxiliary lights 310 and 312. Three-way switch 340 facilitates activating auxiliary lights 310 and 312 when emergency lights 208 are not activated. In the example embodiment, auxiliary lights 310 and 312 are lit whenever emergency lights 208 are lit, and additionally, auxiliary lights 310 and 312 may be lit when emergency lights 208 are not lit. By activating auxiliary lights 310 and 312 upon a determination that brakes 28 have been applied, an additional level of safety, due to increased illumination and therefore, potentially an increase in visibility, is provided.

The methods and systems described herein relate to an emergency lighting system for a vehicle. The emergency lighting system may include a power source, an electrically-operable actuator, a pressure switch, a manual reset circuit, and an emergency light. The electrically-operable actuator is a switch whose state (e.g., "on" or "off") is controllable by applying an electrical signal to the switch. Examples include a relay, a solenoid circuit, solid-state circuits, or the like. The pressure switch is configured to selectively couple the power source and the electrically-operable actuator, for example, based on a property of a measured property of brakes of a vehicle, such as the pressure level of an air brake line or other brake component in the vehicle. The electrically-operable actuator transitions to a first state (e.g., an "on" state) when coupled to the power source. The electrically-operable actuator is configured to couple the power source with an emergency light, for energizing the emergency light, when the electrically-operable actuator is in one of the first state or a second, different state (e.g., an "off" state) and to de-couple the power source from the emergency light when the electrically-operable actuator is in the other of the first state or the second state. Upon receipt of an operator input, the manual reset circuit facilitates control of the electrically-operable actuator to the state of the electrically-operable actuator where the power source is de-coupled from the emergency light (e.g., the "other" of the first state or the second state), thereby deactivating or de-energizing the emergency light. The term "transitions," unless otherwise specified, means changing from one state to another or remaining in a particular state.

The above-described methods and systems for automatically activating an emergency lighting system are cost-effective and highly reliable. The system permits automatically activating an emergency lighting system when brakes on a vehicle are applied in an emergency situation. By utilizing a mechanical property of the brakes of the vehicle, for example, the pressure in the brake pipe, the emergency lighting system is able to be activated without user input. The manual reset circuit, including the bypass line, facilitates the manual deactivation of the emergency lights prior to the recovery of the brake system. Accordingly, the methods and systems described herein facilitate operation of an emergency lighting system in a cost-effective and reliable manner. Further, the design of the bypass circuit prevents the manual reset from persisting after the brake pipe pressure of the vehicle has risen above the predetermined level, therefore enabling the circuit to react to the next emergency brake event. Additionally, the circuit facilitates the "fail-safe" characteristic of the emergency lighting system in that a break or failure in line $L_1$ or a failure of solenoid switch 206 will activate the emergency lights. Moreover, the system facilitates increasing the reliability of the activation of the emergency lights because of the self-containment of the circuit within each locomotive or car. Accordingly, the system does not rely on other locomotives or cars in the consist for notification of an emergency brake event.

Example embodiments of circuits for use in an emergency lighting system are described above in detail. The methods and systems are not limited to the specific embodiments described herein nor to the specific illustrated circuit and steps of operating the circuit, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein. The description above is meant to cover a specific example of the general circuit for use with an emergency lighting system and should not be found limited to the specific embodiment described.

This written description uses examples to disclose the inventive subject matter and also to enable a person of ordinary skill in the art to practice the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
    coupling a power source and an electrically-operated actuator with a pressure switch when a brake pressure level corresponds to a non-applied emergency brake, wherein the electrically-operated actuator is energized when coupled to the power source by the pressure switch;
    coupling the power source and one or more emergency lights with the electrically-operated actuator when the electrically-operated actuator is de-energized in order to power the one or more emergency lights; and
    coupling the power source and the electrically-operated actuator to energize the electrically-operated actuator upon receipt of an operator input.

2. The method of claim 1, wherein the vehicle is a rail vehicle and the one or more emergency lights are within at least one of an operator cab or a passenger area of the rail vehicle.

3. A system comprising:
    a power source;
    an electrically-operated actuator;
    a pressure switch configured to selectively couple the power source and the electrically-operated actuator to transition the electrically-operated actuator between different first and second states, wherein the electrically-operated actuator is configured to couple the power source to an emergency light for energizing the emergency light of a vehicle when the electrically-operated actuator is in the first state, and the electrically-operated actuator is configured to de-couple the power source from the emergency light when the electrically-operated actuator is in the second state; and
    a manual reset device configured to control the electrically-operated actuator from at least one of the first state to the second state or from the second state to the first state upon receipt of an operator input.

4. The system of claim 3, wherein the emergency light is an interior emergency light.

5. The system of claim 3, wherein the emergency light is positioned inside an operator cab of the vehicle and is configured to illuminate at least one of an exit or a path to the exit from the operator cab when the emergency light is powered by the power source.

6. The system of claim 3, wherein the electrically-operated actuator is configured to couple the power source to the emergency light that is positioned inside a passenger area of a vehicle to illuminate at least one of an exit or a path to the exit from the passenger area when the emergency light is powered by the power source.

7. The system of claim 3, wherein the pressure switch is configured to couple the power source and the electrically-operated actuator responsive to a brake pressure level indicating a non-applied emergency brake of the vehicle such that the power source energizes the electrically-operated actuator to prevent activation of the emergency light.

8. The system of claim 3, wherein the pressure switch is configured to decouple the power source from the electrically-operated actuator responsive to a brake pressure level indicating application of an emergency brake of the vehicle such that the electrically-operated actuator allows the power source to activate the emergency light.

9. A system comprising:
    a power source;
    an emergency light;
    an electrically-operated actuator configured to couple the power source with the emergency light to activate the emergency light when the actuator is de-energized, the actuator also configured to decouple the power source from the emergency light to deactivate the emergency light when the actuator is energized; and a pressure switch configured to selectively couple the power source with the actuator responsive to a brake pressure level of a vehicle, wherein the pressure switch is configured to couple the power source with the actuator to energize the actuator and deactivate the emergency light responsive to the brake pressure level indicating non-application of an emergency brake of the vehicle, and wherein the pressure switch is configured to decouple the power source from the actuator to de-energize the actuator and activate the emergency light responsive to the brake pressure level indicating application of the emergency brake.

10. The system of claim 9, further comprising a manual reset device that selectively couples the pressure switch and the actuator, the manual reset device configured to energize the actuator to decouple the power source from the emergency light for deactivating the emergency light responsive to receipt of manual input.

11. The system of claim 9, wherein the emergency light is an interior emergency light.

12. The system of claim 9, wherein the emergency light is positioned inside an operator cab of the vehicle and is configured to illuminate at least one of an exit or a path to the exit from the operator cab when the emergency light is powered by the power source.

13. The system of claim 9, wherein the emergency light is positioned inside a passenger area of the vehicle and is configured to illuminate at least one of an exit or a path to the exit from the passenger area when the emergency light is powered by the power source.

14. The system of claim 9, wherein the actuator includes a solenoid switch.

15. The system of claim 9, wherein the actuator includes an electronic relay.

16. A system comprising:
an electrically-operated actuator configured to couple a power source with a light of a vehicle to activate the light and illuminate an interior of the vehicle when the actuator is de-energized, the actuator also configured to decouple the power source from the light to deactivate the light when the actuator is energized; and a pressure switch configured to selectively couple the power source with the actuator responsive to a brake pressure level of the vehicle, wherein the pressure switch is configured to couple the power source with the actuator to energize the actuator and deactivate the light responsive to the brake pressure level indicating non-application of a brake of the vehicle, and wherein the pressure switch is configured to decouple the power source from the actuator to de-energize the actuator and activate the light responsive to the brake pressure level indicating application of the brake of the vehicle.

17. The system of claim 16, further comprising a manual reset device that selectively couples the pressure switch and the actuator, the manual reset device configured to energize the actuator to decouple the power source from the light for deactivating the light responsive to receipt of manual input.

18. The system of claim 16, wherein the light is an interior emergency light positioned inside the vehicle and configured to illuminate at least one of an exit or a path to the exit from the vehicle when the light is powered by the power source.

19. The system of claim 16, wherein the actuator includes a solenoid switch.

20. The system of claim 16, wherein the actuator includes an electronic relay.

21. A method comprising:
sensing application of an emergency brake of a vehicle by measuring a pressure associated with the emergency brake;

automatically energizing at least one emergency light upon sensing application of the emergency brake of the vehicle, wherein automatically energizing the at least one emergency light comprises de-energizing an electrically-operated actuator through use of a pressure switch configured to selectively couple a power source to the electrically-operated actuator, the electrically-operated actuator configured to couple the power source to the at least one emergency light when the electrically-operated actuator is de-energized; and de-coupling the power source and the actuator upon at least one of release of the emergency brake of the vehicle or receipt of a manual reset input.

22. The method of claim 21, wherein the at least one emergency light includes an interior emergency light of the vehicle and automatically energizing the at least one emergency light comprises illuminating the interior of the vehicle.

23. The method of claim 21, wherein the at least one emergency light is positioned inside an operator cab of the vehicle and automatically energizing the at least one emergency light comprises illuminating at least one of an exit or a path to the exit from the operator cab.

24. The method of claim 21, wherein the at least one emergency light is positioned inside a passenger area of the vehicle and automatically energizing the at least one emergency light comprises illuminating at least one of an exit or a path to the exit from the passenger area.

25. The method of claim 21, further comprising automatically de-energizing the at least one emergency light by decoupling the power source from the electrically-operated actuator responsive to a brake pressure level indicating a non-applied emergency brake such that the power source is coupled with and energizes the electrically-operated actuator to prevent activation of the emergency light.

26. A method comprising:
energizing an electrically-operated actuator that is coupled with a power source and a light of a vehicle when a brake pressure level of the vehicle indicates non-application of a brake of the vehicle, the actuator configured to decouple the power source from the light when the actuator is energized; and coupling the power source with the light of the vehicle to illuminate an interior of the vehicle by de-energizing the actuator, the actuator de-energized responsive to the brake pressure level of the vehicle indicating application of the brake of the vehicle.

27. The method of claim 26, further comprising energizing the actuator to decouple the power source from the light to deactivate the light responsive to receipt of manual input.

28. The method of claim 23, wherein the light is an interior emergency light of the vehicle and coupling the power source with the light of the vehicle illuminates at least one of an exit or a path to the exit from the vehicle.

29. The method of claim 23, wherein energizing the actuator includes supplying electric current to a solenoid switch.

30. The method of claim 23, wherein energizing the actuator includes supplying electric current to an electronic relay.

* * * * *